May 5, 1959     J. S. BARRETT     2,885,045
POWER TRANSMISSION
Filed May 25, 1956
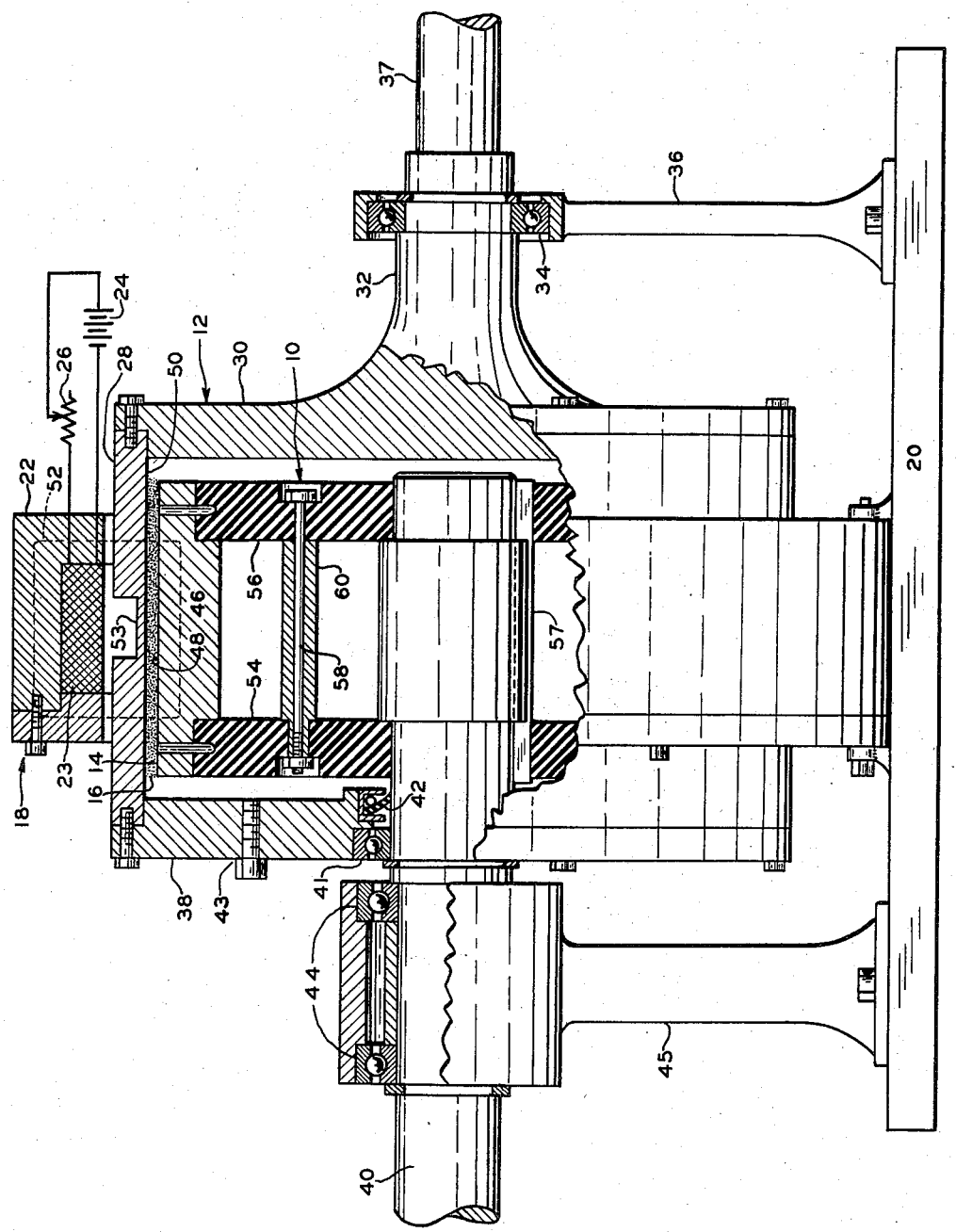
INVENTOR.
JOHN S. BARRETT
BY
ATTORNEY United States Patent Office 2,885,045
Patented May 5, 1959

2,885,045

POWER TRANSMISSION

John S. Barrett, Glen Echo Park, Mo., assignor to Vickers Incorporated, Detroit, Mich., a corporation of Michigan Application May 25, 1956, Serial No. 587,249

5 Claims. (Cl. 192—21.5)

This invention relates to power transmission and more particularly to field responsive torque coupling devices, such as clutches, brakes, dynamometers, drives, etc.

In field responsive torque coupling devices such as magnetic field responsive clutches and brakes which have an enclosed coupling member, a great part of the heat generated at the coupling surfaces due to slip is transferred by conduction from the coupling surfaces of the enclosed coupling member to a shaft which supports the enclosed member or another coupling member. In many such cases the shaft becomes excessively hot causing damage to bearings, seals and other vulnerable parts along the shaft. This is particularly true of magnetic particle torque coupling devices, wherein the particles are retained by enclosing one coupling member in a housing or within another coupling member thus preventing ready heat dissipation from the enclosed coupling member. The outer enclosing member being exposed to outside atmosphere is not subject to the same heat dissipating problem as the enclosed member. An additional source of heat in devices employing electromagnetic fields is the heat of the windings.

According to the present invention a field responsive coupling device is provided in which the amount of heat transferred from an enclosed metal coupling element of a coupling member to a shaft of the device is greatly reduced. This is accomplished in one embodiment of the present invention by interposing a structural material having a low coefficient of heat conductance between the coupling element of an enclosed coupling member and its shaft.

It is therefore an object of the present invention to provide a novel field responsive coupling device wherein the amount of heat ordinarily conductively transferred through the structure from the coupling element of an enclosed coupling member to a shaft of the device is greatly reduced by thermal insulation.

Another object of the present invention is to provide a magnetic field responsive coupling device wherein the heat ordinarily conducted to a shaft from the coupling element of an enclosed coupling member is greatly reduced by interposed thermal insulation.

Another object is to provide a magnetic field responsive coupling device wherein coupling surfaces of an enclosed coupling member are heat insulated from a shaft in the device.

Another object of the present invention is to provide a novel magnetic field responsive coupling device having an inner coupling member substantially enclosed by an outer coupling member wherein the amount of heat conductively transferred from the coupling surfaces of the inner member to a shaft supporting at least one of the coupling members is greatly reduced by interposed structure made of heat insulating material.

Another object of the invention is to provide a magnetic field responsive coupling device wherein a barrier formed of heat insulating material is interposed between the coupling element of an enclosed coupling member and a shaft of the device.

Another object of the invention is to provide a magnetic field responsive coupling device wherein a barrier formed of heat insulating material is interposed between the coupling element of an enclosed coupling member and its shaft.

A further object is to provide a magnetic field responsive coupling device in which the structural path between the coupling element of an inner coupling member and a shaft in the device is completely intercepted by structure made of heat insulating material.

A further object is to provide a magnetic field responsive coupling device in which the structural path between the coupling element of an inner coupling member and its shaft is completely intercepted by structure made of heat insulating material.

Further objects and advantages of the present invention will be apparent from the following description, reference being had to the accompanying drawing wherein a preferred form of the present invention is clearly shown.

In the drawing the single figure is a view partly in cross section illustrating the use of the invention as embodied in a magnetic particle clutch.

As seen in the drawing, the magnetic particle clutch shown by way of example includes a pair of relatively rotatable coupling members 10 and 12 separated by a magnetizable air gap 14 having disposed therein magnetic particles 16, and which is traversed by a magnetic field produced by a magnetizing element 18 surrounding the outer member 12 and secured to a base 20. The magnetizing element includes a magnetic yoke 22 with an exciting winding 23 energized from a current source such as a battery 24 through an adjustable resistance 26. The magnetic particles 16 may be made of iron, nickel, or other suitable ferromagnetic material and may be lubricated or unlubricated as desired. Particle sizes ranging from 6 to 100 microns have been successfully used in magnetic particle coupling devices.

The outer coupling member 12 includes a cylindrical ferromagnetic coupling element 28 which is secured at one end to a circular end cap 30 provided with a hub portion 32 mounted for rotation in a bearing 34 carried by a standard 36 attached to the base 20. The other end of the cylindrical element 28 is substantially closed by a circular end cap 38 with a central aperture through which the shaft 40 of the inner member 10 extends. Although shaft 40 principally supports the inner coupling member 10 it is also a shaft for the outer member 12 in that it provides support to one end of the outer coupling member 12 by means of a bearing 41. It will be appreciated that, if desired, the bearing 41 can be dispensed with and the total support of the outer member 12 be placed on the hub 32, by journalling hub 32 in double bearings as hereinafter described for the inner coupling member, thus providing cantilever support. An annular seal 42 carried by the cap 38 and engaging shaft 40 prevents the escape of magnetic particles from the space between the coupling members. At 43, a filler aperture closed by a removable plug provides a convenient means for introducing a charge of magnetic particles into the space between the outer and inner coupling members. The end caps 30 and 38 are preferably made of nonmagnetic material such as stainless steel, aluminum, etc.

The inner coupling member 10, which is substantially enclosed by the outer member 12, is fixed to the shaft 40 which is journalled in bearings 44 carried by a standard 45 attached to the base 20. The inner coupling member 10 includes a cylindrical ferromagnetic coupling element 46 which has an outer peripheral coupling surface 48 spaced from and facing the inner peripheral coupling surface 50 of the outer coupling element 28 that surrounds and helps enclose the inner coupling element 46. When magnetized by the magnetizing element 18, the magnetic particles 16 in the gap 14 between the surfaces 48 and 50 form a force-transmitting bond between the coupling members 10 and 12 thereby to provide torque transmission for braking or driving purposes as desired. The main magnetic path is indicated by the dotted line 52 which traverses the air gap 14. A thin restriction 53 in the coupling element 46 forms a saturable bridge. The magnetic particles in the gap bind the coupling members together and resist relative rotation therebetween to an extent dependent upon the load and the degree of magnetization provided by the coil excitation, the range of operation being from substantially 100% slip to zero slip or synchronous operation.

The coupling members may be interchangeably employed as driving or driven members, for example, if the member 10 is connected through shaft 40 to a prime mover, the outer member 12 will be driven member and may be connected to a load through the shaft 37 attached to the hub portion 32. Also, the coupling device may be used as a brake, in which case one of the coupling members, for example coupling member 10, may be locked in a stationary position by any suitable means, as by immobilizing its shaft. It will be appreciated that although one coupling member may be stationary, the two coupling members are relatively rotatable since at least one rotates with respect to the other.

A great amount of heat is generated at the coupling surfaces due to power losses, mainly, heat generated during non-synchronous or slip operation.

According to the present invention the amount of heat transferred from the coupling surfaces of the inner coupling member to other parts of the coupling device is greatly reduced by interposing structure made of heat insulating material in the structural path which extends from the coupling surfaces of the coupling member to a shaft in the device.

In the embodiment shown the coupling element 46 is heat insulated from its shaft 40 by supporting discs 54 and 56 interposed between the coupling element 46 and the shaft 40. The magnetic coupling element 46 is secured to the heat insulating discs 54 and 56 by pins, and the discs are fixed against rotation relative to the shaft 40 by a key 57 in registering slots formed in the discs and the shaft 40. Axial stability of the discs is provided by the clamping action of bolts 58 (only one shown) which extend axially through the discs and spacer sleeves 60.

The thermal insulating means of the present invention, for example the discs 54 and 56, may be made of any suitable material having a low thermal conductivity and of sufficient mechanical strength and dimensional stability under intended operating conditions. Generally, any nonmetallic structural material has low heat conductivity and therefore can be used for heat insulating purposes. Known examples of such materials are plastics, ceramics, glass, glass fiber products, fiberboard, asbestos, wood and impregnated fabrics. The above materials may be in various forms and mixtures, for example, glass fiber or fabrics in a suitable binder or resin, such as a melamine, phenolic or silicone resin, to provide mechanical strength, may be used. Other examples are mica and wood flour in plastic binders such as the above resins. Generally, all electrical insulators are considered good thermal or heat insulators.

Because the insulating discs 54—56 completely separate the magnetic coupling element 46 from the shaft 40 with heat insulating material, most of the heat generated at the peripheral surfaces 48 of the element 46 will be forced across the gap 14 into the outer member 12 and thence readily to the outer air, and only a small part of the heat will be conducted through the structural path from the magnetic runner 46, through the insulating discs 54 and 56 to the shaft 40, thence through the shaft to the seal 42 and bearings 41 and 44. Thus, although linked by a structural path to the coupling element 46, the shaft 40, seal 42 and bearings 41—44 will be protected from the heat of the runner 46 and thereby operated at relatively low temperatures.

While the form of embodiment of the invention as herein disclosed constitutes a preferred form, it is to be understood that other forms might be adopted, all coming within the scope of the claims which follow.

What is claimed is as follows:

1. In a magnetic field responsive torque coupling device which includes spaced inner and outer coupling members, and wherein the inner member is substantially enclosed by the outer member and has a ferromagnetic coupling element subject to heating, and which device includes support means for supporting said inner member, the combination therewith of means having a substantially lower coefficient of thermal conductivity than said element for insulating said element from said support means, said thermally insulating means comprising structural heat insulating material means interposed between said element and said support means, whereby all the torque transmitted between the coupling element and the support means passes through said heat insulating material means.

2. In a magnetic field responsive torque coupling device which includes spaced inner and outer coupling members, and wherein the inner member is substantially enclosed by the outer member and has a ferromagnetic coupling element subject to heating, and which device includes a shaft for supporting said inner member, the combination therewith of means having a substantially lower coefficient of thermal conductivity than said element for insulating said element from said shaft, said thermally insulating means comprising structural heat insulating material means interposed between said element and said shaft, whereby all the torque transmitted between the coupling element and the shaft passes through said heat insulating material means.

3. In a magnetic field responsive torque coupling device which includes spaced relatively rotatable inner and outer coupling members, and wherein the inner member is substantially enclosed by the outer member and has a cylindrical ferromagnetic coupling element subject to heating, and which device includes a shaft for carrying said inner member, the combination therewith of means having a substantially lower coefficient of thermal conductivity than said element for thermally insulating said element from said shaft, said means comprising a structure consisting of heat insulating material means between said element and said shaft, said latter means completely insulating said element from said shaft, whereby all the torque transmitted between the coupling element and the shaft passses through said heat insulating material means.

4. A magnetic particle torque coupling device comprising relatively rotatable spaced inner and outer coupling members, said inner member being substantially enclosed by said outer member, said inner member having a magnetic coupling element subject to heating, a shaft for supporting said inner coupling member, and means for reducing the amount of heat transferred from said element to said shaft, said means including heat insulating structural material means, having a substantially lower coefficient of thermal conductivity than said element, between said element and said shaft, said means completely insulating said element from said shaft, whereby all torque transmitted between the coupling element and the shaft passes through said heat insulating material means.

5. A magnetic particle torque coupling device comprising relatively rotatable spaced inner and outer coupling members, said inner member being substantially enclosed by said outer member, said inner member having a magnetic coupling element subject to heating, a shaft for supporting said inner coupling member, the improvement comprising a pair of parallel, axially spaced apart torque transmitting members forming a part of the inner member, said torque members having substantially lower coefficient of thermal conductivity than said element, and located between said element and said shaft, the torque members completely insulating said element from said shaft.

References Cited in the file of this patent
UNITED STATES PATENTS

| | | |
|---|---|---|
| 2,437,670 | Adamson | Mar. 16, 1948 |
| 2,709,928 | Jones | June 7, 1955 |
| 2,712,371 | Duncan | July 5, 1955 |
| 2,743,800 | Levinson et al. | May 1, 1956 |
| 2,777,965 | Winther | Jan. 15, 1957 |